US005365736A

United States Patent [19]

Yamamoto

[11] Patent Number: 5,365,736

[45] Date of Patent: Nov. 22, 1994

[54] ACCUMULATOR WITH CHECK STOPPER

[75] Inventor: Tomokazu Yamamoto, Fuji, Japan

[73] Assignee: Jatco Corporation, Fuji, Japan

[21] Appl. No.: 29,654

[22] Filed: Mar. 11, 1993

[30] Foreign Application Priority Data

Mar. 11, 1992 [JP] Japan .................................. 4-087748

[51] Int. Cl.[5] ......................... F16D 31/02; F01B 31/18; F16K 15/04

[52] U.S. Cl. ......................................... 60/413; 92/183; 303/87; 137/533.11; 138/31

[58] Field of Search ............................ 138/31; 92/183; 137/513.5, 533.11, 539; 303/87, 116.1

[56] References Cited

U.S. PATENT DOCUMENTS 30,351 10/1860 Robinson et al. .................... 92/183
2,817,361 12/1957 Mercier ................................ 138/31
3,718,375 2/1973 Bowler et al. ............... 303/116.1 X
3,841,349 10/1974 Todd .......................... 137/533.11 X
4,281,679 8/1981 Stearns ........................ 137/533.11 X
4,969,697 11/1990 Lindenman .................. 303/116.1 X
5,020,864 6/1991 Tanaka ............................ 303/87 X
5,031,969 7/1991 Siegel ............................... 303/87 X
5,107,890 4/1992 Gute ................................... 137/539

FOREIGN PATENT DOCUMENTS 63-308257 12/1988 Japan .

*Primary Examiner*—Edward K. Look
*Assistant Examiner*—John Ryznic
*Attorney, Agent, or Firm*—Foley & Lardner

[57] ABSTRACT

An accumulator for use in a hydraulic control circuit comprises a check valve for allowing a suction of air into a working fluid pressure chamber from the atmosphere. The check valve includes a valve cylinder integrally formed with a member for defining the working fluid pressure chamber. The check valve includes a check ball movable within a bore of the cylinder, and a ball stopper having an outer peripheral surface formed with mesh-like grooves press fitted into the bore to retain the ball within the bore.

6 Claims, 2 Drawing Sheets

ACCUMULATOR WITH CHECK STOPPER

BACKGROUND OF THE INVENTION

The present invention relates to an accumulator for use in a hydraulic control circuit for an automatic transmission of a motor vehicle, etc.

The automatic transmission uses a rotary hydraulic clutch for shifting of a speed ratio. In order to alleviate a sudden change in hydraulic pressure for the clutch, an accumulator is provided to a hydraulic passage to a clutch drum. If, during disengagement of the clutch, the clutch drum as released from an engagement state rotates at high speed, hydraulic pressure due to centrifugal force is produced within a hydraulic chamber in the clutch drum, discharging oil in the same way as a pump. At the same time, oil is sucked from a hydraulic control valve via the hydraulic passage. Referring to FIG. 3, in order to prevent the clutch from falling into a semiengagement state due to hydraulic pressure produced by centrifugal force operating on sucked oil, JP-A 68-308257 teaches to arrange to the accumulator 1 a check valve 4 for allowing an inflow of air into a working pressure chamber r.

With this prior art, since the accumulator 1 is disposed in a higher position than that of the hydraulic control valve, a change in the oil surface due to an increase in the oil volume on variations in temperature or due to an inclination of the motor vehicle fails to make the check valve 4 immersed in oil, which continues to function and carries out air suction in case of necessity.

With the prior art accumulator, however, the check valve 4 by way of a different part is built into a piston 2. Specifically, as shown in FIG. 3, a check valve unit is constructed so that a check ball 8 is disposed in a valve cylinder 5 having a through hole 6 across which a check pin 7 is arranged. As a result, an engagement portion of the piston 2 with the check valve 4 necessitates machining with a high accuracy, resulting in not only an increase in the number of processes of assembling work and a manufacturing cost, but a possible omission of parts such as the check pin 7, etc.

Moreover, considerable attention is required for securing sealing of the engagement portion which is a fundamental function. Additionally, a through hole 9 for receiving the check pin 7 should be formed in the valve cylinder 5, which becomes a fact or of aggravating problems of the number of processes of assembling work, a manufacturing cost, and a sealing.

It is, therefore, an object of the present invention to provide an accumulator for use in a hydraulic control circuit which enables a reduction in the number of processes of assembling work and a manufacturing cost, and an elimination of the problem of sealing.

SUMMARY OFT HE INVENTION

There is provided, according to the present invention, an accumulator for use in a hydraulic control circuit, the accumulator including a cylinder and a piston slidably disposed therein, the accumulator having a working fluid pressure chamber with a variable volume, comprising:

a check valve arranged to allow a suction of air into the working fluid pressure chamber from the atmosphere, said check valve including a valve cylinder integrally formed with means for defining the working fluid pressure chamber, said valve cylinder having a first bore disposed on the side of the working fluid pressure chamber and a second bore communicating with the atmosphere.

DETAILED DESCRIPTION OF THE INVENTION

Figure 1:
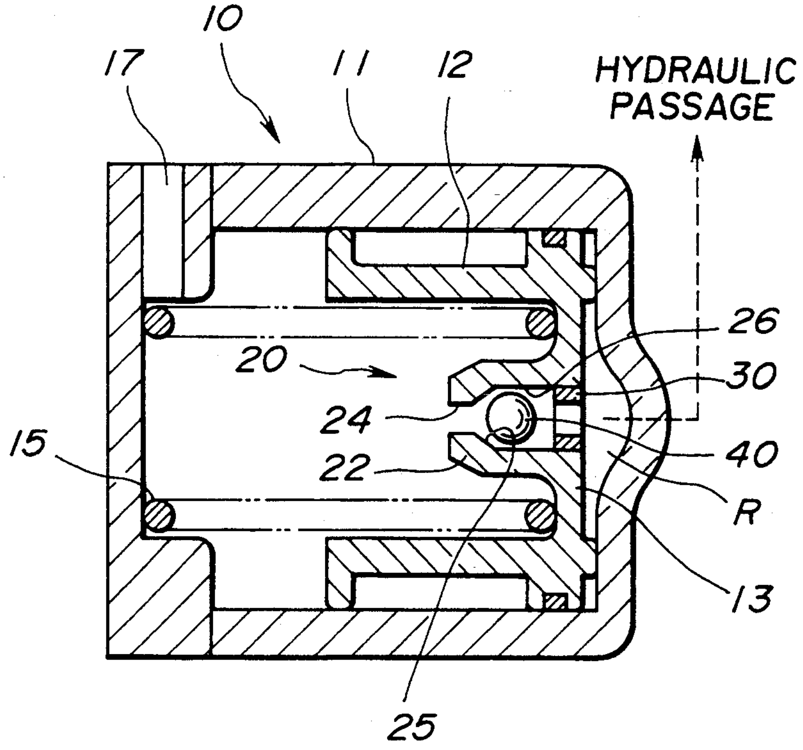
FIG. 1 is a longitudinal section showing a preferred embodiment of an accumulator for a hydraulic control circuit according to the present invention.

Referring to FIG. 1, a piston 12 is slidably disposed in a main body cylinder 11 of an accumulator 10, and is biased by a spring 15. A volume of a working fluid pressure chamber R of the accumulator 10 is variable by hydraulic pressure applied thereto. The piston 12 is made of a resin, and has a top wall 13 facing onto the working fluid pressure chamber R with which a valve cylinder 22 of a cheek valve 20 is integrally formed so as to turn to the inside of the piston 12. The valve cylinder 22 has a small diameter bore 24 on the side of the inner part of the piston 12, and a large diameter bore 26 on the side of the outer part thereof, a tapered bore 25 being connected between the two. A check passage is thus formed to pass through the top wall 13. The inside of the piston 12 communicates with the atmosphere through a passage 17.

Figure 2:
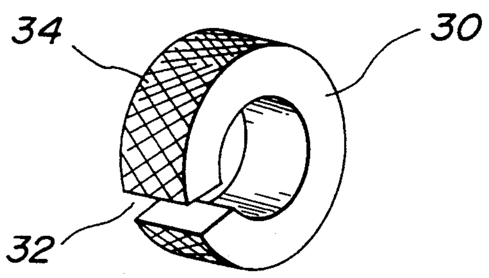
FIG. 2 is a perspective view showing a ball stopper.
Figure 3:
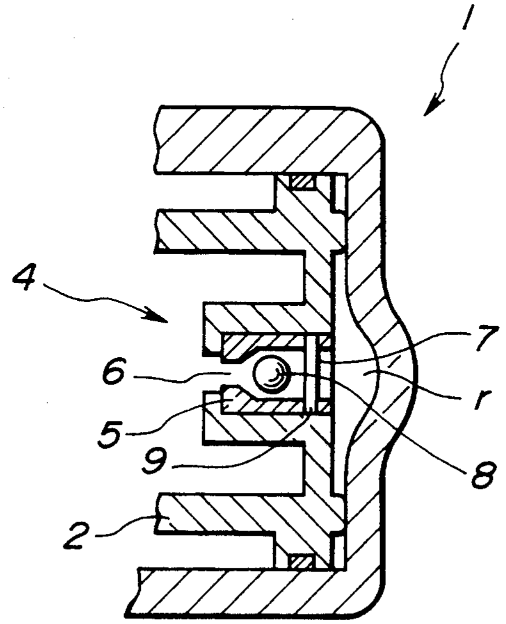
FIG. 3 (PRIOR ART)
FIG. 3 is a view similar to FIG. 1, showing a known accumulator.

Referring also to FIG. 2, press fitted into the large diameter bore 26 is a C-ring-shaped ball stopper 30 having a slit 32. A check ball 40 having a diameter larger than that of the small diameter bore 24 is movably disposed within a chamber formed by the large diameter bore 26 and the tapered bore 25. The ball stopper 30 has an outer peripheral surface formed with mesh-like grooves 34, and has, when being contracted and press fitted into the large diameter bore 26, an inner diameter smaller than the diameter of the check ball 40 which fails to fall away therefrom. Thus, the check ball 40 contacts and separates from the tapered bore 25, so that upon disengagement of a clutch, air is sucked into the working fluid pressure chamber R provided between the top wall 13 of the piston 12 and the cylinder 11, restraining an occurrence of a semiengagement state of the clutch, etc. In addition to this main function, if air is found within the working fluid pressure chamber R upon engagement of the clutch, that air is discharged in the opposite direction, i.e. from the working fluid pressure chamber R to the atmosphere, avoiding inconveniences such as an operation lag due to air compressed, etc. When the discharge of air is desired to increase, a predetermined slit may be provided on a surface of the tapered bore 25, for example.

With the above constitution, since the valve cylinder 22 is integrated with the piston 12, there is no need of machining of the engagement portion of the valve cylinder 22 and assembling work thereof, without any problem of sealing. Moreover, the check ball 40 is prevented to fall away only by press fitting the ball stopper 30 into the large diameter bore 26. Even if a volume expansion or contraction of the piston 12 is produced by variations in temperature, the ball stopper 30 can be held by itself by a resilient force thereof and engagement of the mesh-like grooves 34 with the valve cylinder 22, i.e. the piston 12 made of a resin. Therefore, there is no need of a check pin and a through hole thereof, resulting in no occurrence of problems such as an omission of parts, etc.

Having described the present invention in connection with the preferred embodiment, it is to be noted that the present invention is not limited thereto, and various changes and modifications may be possible without depart from the spirit of the present invention. By way of example, the check valve 20 is arranged to the piston of the accumulator 10, alternatively, the valve cylinder of the check valve may be integrally formed with a bottom wall of the main body of the accumulator. In that case, the large diameter bore is disposed on the side of the working fluid pressure chamber, whereas the small diameter bore is disposed on the side of the outer part of the cylinder from which air can be sucked.

What is claimed is:

1. An accumulator for use in a hydraulic control circuit., the accumulator having a working fluid pressure chamber with a variable volume, the accumulator comprising:

a cylinder;

a piston slidably disposed within the cylinder; and a check valve arranged to allow a suction of air into the working fluid pressure chamber from the atmosphere, said check valve including a valve cylinder integrally formed with means for defining the working fluid pressure chamber, said valve cylinder having a first bore disposed on the side of the working fluid pressure chamber and a second bore communicating with the atmosphere, said check valve including a check ball movably disposed in said first and second bores, and a ball stopper press fitted into said first bore for preventing said check ball from falling away therefrom, said ball stopper having an outer peripheral surface formed with mesh-like grooves.

2. An accumulator as claimed in claim 1, wherein said ball stopper is in the form of a C-ring having a slit.

3. An accumulator as claimed in claim 1, wherein said first bore has a relatively large diameter, and said second bore has a relatively small diameter.

4. An accumulator as claimed in claim 1, wherein said working fluid pressure chamber defining means are integrally formed with a top wall of said piston.

5. An accumulator as claimed in claim 1, wherein said working fluid pressure chamber defining means are integrally formed with a bottom wall of the cylinder.

6. An accumulator as claimed in claim 5, wherein said working fluid pressure chamber defining means are made of a resin.

* * * * *